Patented July 20, 1948

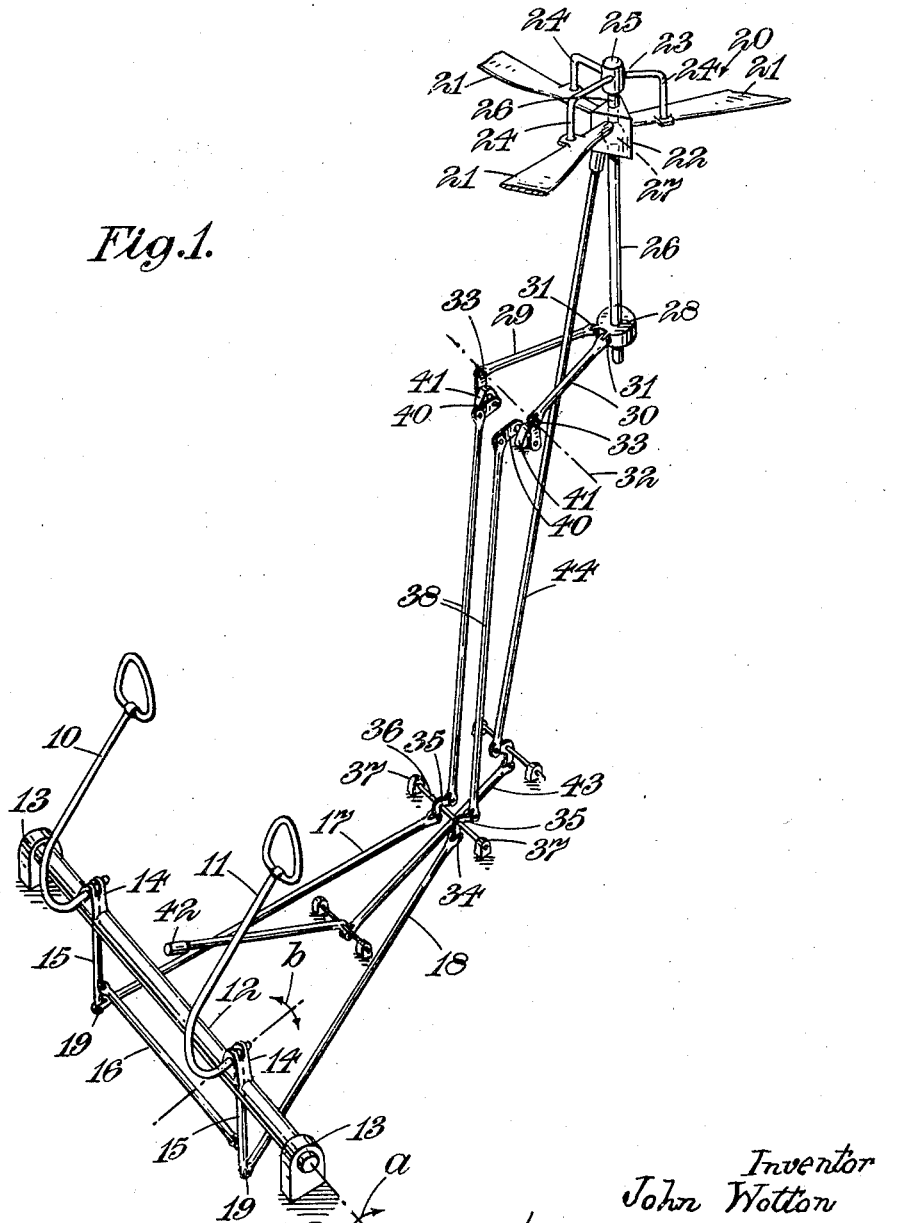

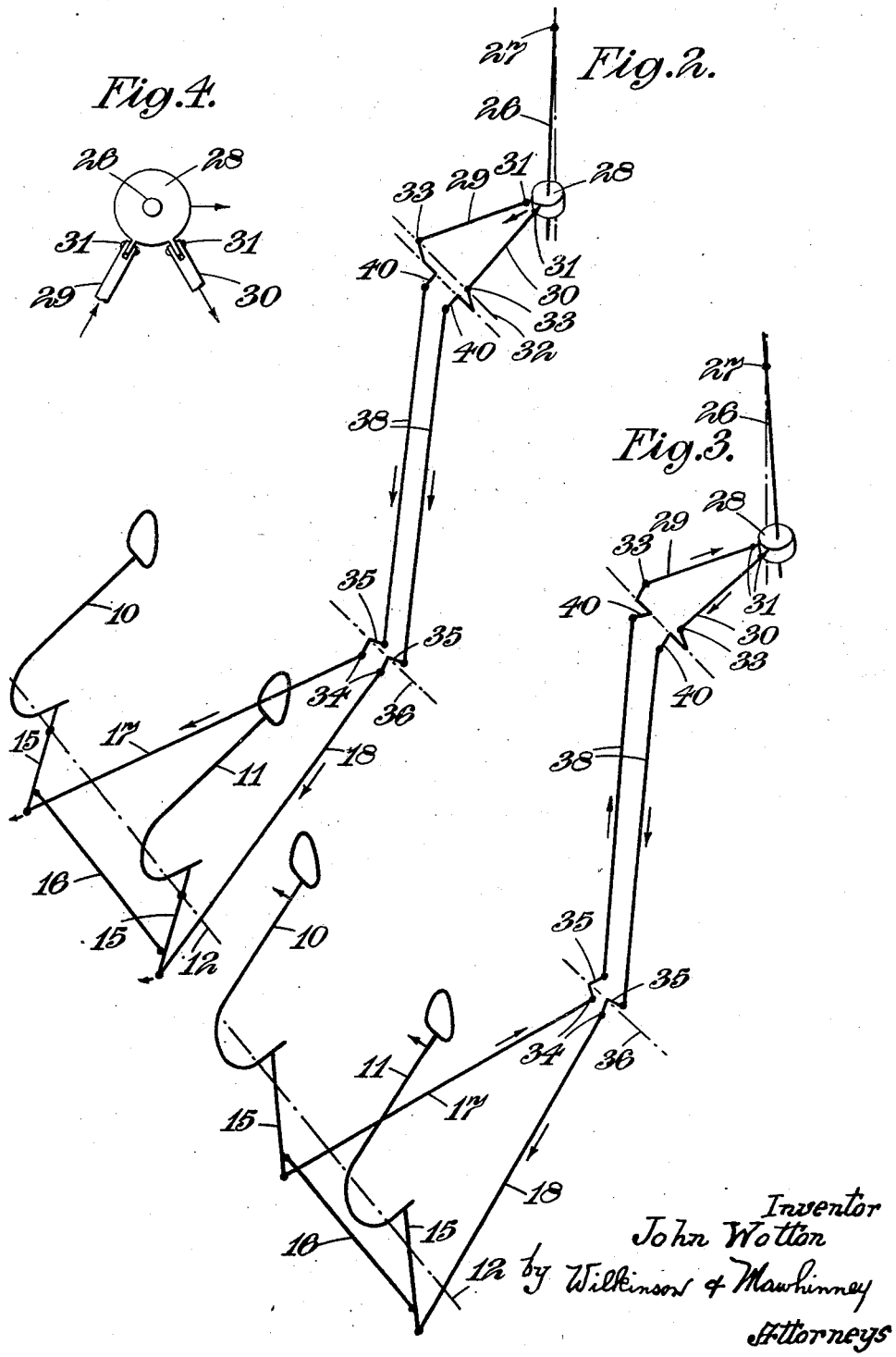

2,445,550

UNITED STATES PATENT OFFICE 2,445,550

CONTROL SYSTEM FOR ADJUSTING THE INCIDENCE OF THE BLADES OF THE ROTOR OF A ROTARY-WING AIRCRAFT

John Wotton, Bristol, England, assignor to The Bristol Aeroplane Company Limited, Bristol, England, a British company Application June 3, 1947, Serial No. 752,048 In Great Britain May 30, 1946

Section 1, Public Law 690, August 8, 1946

3 Claims. (Cl. 244—17)

This invention concerns control systems for rotary-wing aircraft.

It is common practice with such aircraft, for example in helicopters, to adjust the incidence of the blades of the sustaining rotor both as to its datum value and as to its cyclic change during rotation of the rotor.

It is an object of the present invention to provide a simple and effective control for adjusting the incidence of the blades of a sustaining rotor.

According to one aspect of the present invention a control for adjusting the incidence of a rotor for a rotary-wing aircraft comprises a cockpit control movable in two directions mutually at right-angles, a pair of articulated, converging rods jointed together and movable by the control in one direction to pull or push both rods and in the other direction to pull one and push the other rod and a connection between the rods and an element of the incidence adjusting mechanism to which the pull and/or push of the rods is applied to reproduce the control movements.

Normally the pilot's flight control is required to produce equal control movements when it is moved in opposite senses. To this end each rod in both pairs of rods is of the same length.

So that the invention may be better understood a practical application of it will now be described, by way of example, with reference to the accompanying drawings in which:

Figure 1 is a diagrammatic perspective view of a control system showing the invention applied to an instructional helicopter, and Figures 2, 3 and 4 are views showing the geometrical layout of the system of Figure 1 in two positions of adjustment.

The flight controls are housed in a cockpit and comprise a pair of columns 10 and 11 which are disposed side by side: the column 10 is for the instructor and the column 11 for the pupil.

The columns are supported by a torque tube 12 which is mounted for rotation in blocks 13 suitably carried in the aeroplane. When a column (10 or 11) is moved in the fore-and-aft direction the torque tube 12 will be turned in the direction a. Since both columns are carried by the tube fore-and-aft movements of one column are transmitted to the other column.

The lower end of each column enters a transmission box (diagrammatically indicated at 14) and is supported therein for sideways movement, i. e., in the direction b. That part of each column lying within its box 14 carries a downwardly extending rod 15. Thus, when a column 10 or 11 is moved sideways the movements are transmitted to its associated rod 15 without the torque tube 12 being adjusted.

The tubes 15 are connected together by a cross-bar 16 and each is further connected (at 19) to one of a pair of inclined rods 17, 18, the bar 16 being at the divergent end of the rods. A triangulated structure of jointed members is thus produced, the apex being open. This construction provides that sideways movement of a rod 15 is transmitted by the cross-bar 16 to the other such rod.

It will be understood that when a control column 10 or 11 is moved in the fore-and-aft direction to rotate tube 12 such movement is simultaneously applied to both rods 15.

The lower extremity of each rod 15 is pin jointed as at 19 to a side member 17 or 18 of the triangulated structure. The side members 17, 18 converge from the member 16 towards an apex point in the normal position of the flight controls. The angle between a rod 17 or 18 and the cross-bar 16 is acute—as clearly shown in Figure 1 and the rods are of the same length.

The rotor is diagrammatically illustrated at 20 and comprises three blades 21 which are carried, in known manner, by a hub 22 so that each is capable of incidence adjustments. These adjustments are effected by a spider 23, an arm 24 of which is connected with each blade. The nave 25 of the spider surrounds the upper end of a control rod 26 which is supported within the hub 22 by a ball-and-socket joint indicated at 27. The rod 26 is therefore mounted for limited swinging movements to adjust the spider 23 and tilt it. The spider rotates with the blades 21 upon the stationary rod 26, and being tilted, cyclically varies the incidence of the blades as they rotate. The amount and the sense of the incidence change is determined by the setting of the spider.

The lower end of the rod 26 is surrounded by a sleeve 28 which is adjustable in any direction in a horizontal plane to impart the swinging movements to the rod. The sleeve 28 is adjusted by a pair of rods 29 and 30 which converge towards each other and are each pin jointed at 31 to the sleeve. The adjusting rods 29, 30 are disposed in a similar manner to the rods 17, 18 that is, the rods 29, 30 are of equal length and the angle between each such rod and a line 32 joining the divergent ends 33 is the same as the angle between rods 17, 18 and cross-bar 16. The rods 29, 30 may be said to form a second triangulated structure having jointed members.

The divergent ends 33 of the adjusting rods 29, 30 are respectively connected with the ends 34 of the side members 17, 18 by means of a suitable lever system. For example, each end 34 is connected with a bell-crank lever 35 pivotally mounted on rod 36 carried by blocks 37 and the bell-crank lever is in turn connected by a link rod 38 with a bell-crank lever 40 pivotally mounted in blocks 41. The bell-crank levers 40 are attached one each to the divergent end 33 of a rod 29, 30.

With the arrangement described when a control column 10 or 11 is moved in the fore-and-aft direction such movement is transmitted to the cross-bar 16 so that it is moved in a direction parallel with itself and normal to its long axis (see Figure 2). As a result the members 17, 18 are both moved by an equal amount both in the same direction, such movements being applied to the bell-crank levers 35, the link rods 38, the bell-crank levers 40 and thence to the adjusting rods 29 and 30. In other words, rods 17, 18 move together along a line intersecting the angle between them and the rods 29 and 30 also move in a direction parallel to said line and by an amount proportionate to the movement of the rods 17, 18. Sleeve 28 and rod 26 are therefore moved in the fore-and-aft direction of the aircraft and the rod adjusts the spider 23 for the purpose described.

When a control column 10 or 11 is moved sideways the movement is transmitted to the cross-bar 16 so that it is moved in the direction of its long axis (Figure 3). As a consequence the rods 17, 18 are moved sideways through an arc with the result that one rod is pushed towards bell-crank 35 and rod 18 drawn away therefrom, the movement imparted to the rods being approximately equal. As a result one link 38 will be raised and the other will be lowered thereby adjusting rod 29 in the same direction and to a proportionate amount as the rod 17 and rod 30 in the same direction and to a proportionate amount as rod 18. The effect of this, i. e., as is shown in Figure 4, is that the sleeve 28 performs a movement which is the resultant of said two movements, the resultant being in a direction parallel with the sideways movement of the column 10 or 11. This movement is of course, at right angles to the movement imparted to rod 26 by fore-and-aft movement of the columns 10, 11.

It will be appreciated that control columns 10, 11 may be moved in a direction compounded of a fore-and-aft and a sideways movement in which case the rod 26 partakes of a similar movement suitably to adjust the spider 23.

The datum incidence of the blades 21 is adjusted by a hand lever 42 which is connected with the blades by a linkage 43, 44. As this forms no part of this invention it will not be more fully described.

I claim:

1. A control for adjusting the incidence of a rotor for rotary-wing aircraft comprising an incidence adjusting mechanism, a cockpit control movable in two directions mutually at right angles, a pair of articulated, converging rods jointed together and movable by the control in one direction to pull or push both rods and in the other direction to pull one and push the other rod and a connection between the rods and an element of the incidence-adjusting mechanism to which the pull and/or push of the rods is applied to reproduce the control movements.

2. A control as claimed in claim 1 wherein said connection comprises a second pair of converging rods similarly disposed to the first rods, a lever system connecting each first rod with one of said second rods by which the push and/or pull movements are applied to the second rods, and a single member to which the second rods are jointed and which is connected with the incidence-adjusting mechanism.

3. A control according to claim 2 in which the first pair of converging rods are of equal length and the second pair of rods are also of equal length.

JOHN WOTTON.